(12) United States Patent
Laurent et al.

(10) Patent No.: US 10,626,649 B2
(45) Date of Patent: Apr. 21, 2020

(54) TAILGATE OPENING SYSTEM HAVING TWO CONNECTING RODS

(71) Applicants: FLEX-N-GATE FRANCE, Audincourt (FR); Plastic Omnium Automotive Exteriors GmbH, München Allemagne (DE)

(72) Inventors: Claude Laurent, Voujeaucourt (FR); Frederic Bois, Strasbourg (FR); Virgile Gros, Lyons (FR)

(73) Assignees: FLEX-N-GATE FRANCE, Audincourt (FR); PLASTIC OMNIUM AUTOMOTIVE EXTERIORS GMBH, München Allemagne (DE)

( * ) Notice: Subject to any disclaimer, the term of this patent is extended or adjusted under 35 U.S.C. 154(b) by 0 days.

(21) Appl. No.: 15/761,046

(22) PCT Filed: Sep. 16, 2016

(86) PCT No.: PCT/EP2016/072036
§ 371 (c)(1),
(2) Date: Mar. 16, 2018

(87) PCT Pub. No.: WO2017/046367
PCT Pub. Date: Mar. 23, 2017

(65) Prior Publication Data
US 2018/0283072 A1   Oct. 4, 2018

(30) Foreign Application Priority Data

Sep. 17, 2015   (FR) .................................... 15 58765

(51) Int. Cl.
*B62D 25/00* (2006.01)
*E05D 15/58* (2006.01)
(Continued)

(52) U.S. Cl.
CPC ............ *E05D 15/582* (2013.01); *B60J 5/106* (2013.01); *B60J 5/12* (2013.01); *E05D 5/062* (2013.01);
(Continued)

(58) Field of Classification Search
CPC ... E05D 15/582; E05D 15/581; E05D 15/403; E05D 15/46; E05D 15/408; E05D 5/062;
(Continued)

(56) References Cited

U.S. PATENT DOCUMENTS 5,577,793 A * 11/1996 Kobasic ................. B60J 5/0498
296/146.12
6,386,613 B1 * 5/2002 Vader ....................... B60J 5/108
296/146.12
(Continued)

FOREIGN PATENT DOCUMENTS

GB          2264533 A    9/1993
WO    WO2006097082 A1    9/2006

OTHER PUBLICATIONS

French Preliminary Search Report for application No. FR1558765, dated Jul. 7, 2016, 2 pages.
(Continued)

*Primary Examiner* — Jerry E Redman
(74) *Attorney, Agent, or Firm* — Reising Ethington P.C.

(57) ABSTRACT

A rear vehicle assembly includes a body structure, a moveable tailgate, and an opening and closing device. The opening and closing device includes connecting rods fixing the tailgate to the body structure. The connecting rods are hinged at a first end to the body structure and at a second end to a lateral edge of the tailgate. One of the connecting rods includes first and second rectilinear sections and a curved
(Continued)

section. The first and second rectilinear sections are located on respective concave and convex sides of the curved section.

8 Claims, 2 Drawing Sheets

(51) Int. Cl.
*B60J 5/10* (2006.01)
*B60J 5/12* (2006.01)
*E05D 5/06* (2006.01)
*E05D 15/40* (2006.01)
*E05D 15/46* (2006.01)
*E05D 15/48* (2006.01)

(52) U.S. Cl.
CPC ......... *E05D 15/403* (2013.01); *E05D 15/408* (2013.01); *E05D 15/46* (2013.01); *E05D 2005/067* (2013.01); *E05D 2015/485* (2013.01); *E05Y 2900/546* (2013.01)

(58) Field of Classification Search
CPC ......... E05D 2015/485; B60J 5/16; B60J 5/12; E05Y 2900/546
USPC ....................................................... 296/56
See application file for complete search history.

(56) References Cited

U.S. PATENT DOCUMENTS

| | | | | |
|---|---|---|---|---|
| 6,618,904 | B1 * | 9/2003 | Nagy | E05D 3/145 16/288 |
| 8,296,906 | B2 * | 10/2012 | Wisniewski | E05D 3/14 16/250 |
| 8,572,808 | B2 * | 11/2013 | Bononnie | E05F 3/20 16/286 |
| 9,764,711 | B2 * | 9/2017 | Narita | B62D 25/10 |
| 2003/0056330 | A1 * | 3/2003 | Westerdale | E05D 3/145 16/370 |
| 2005/0264144 | A1 * | 12/2005 | Verbeek | E05D 15/46 312/323 |
| 2007/0124893 | A1 * | 6/2007 | Brustle | E05F 1/1075 16/296 |
| 2008/0115322 | A1 * | 5/2008 | Migli | E05D 15/46 16/283 |
| 2009/0160210 | A1 | 6/2009 | Legler et al. | |
| 2012/0079684 | A1 * | 4/2012 | Tumler | E05D 11/10 16/277 |
| 2013/0031746 | A1 * | 2/2013 | Hasegawa | E05D 3/14 16/50 |
| 2014/0175828 | A1 | 6/2014 | Lechkun et al. | |
| 2016/0194911 | A1 * | 7/2016 | Im | E05F 15/614 49/70 |
| 2017/0267074 | A1 * | 9/2017 | Papanikolaou | B60J 5/104 |
| 2018/0283072 | A1 * | 10/2018 | Laurent | B60J 5/106 |
| 2019/0055767 | A1 * | 2/2019 | Pignard | B60J 5/106 |

OTHER PUBLICATIONS

International Search Report for International application No. PCT/EP2016/072036, dated Dec. 1, 2016, 2 pages.

Written Opinion in French for International application No. PCT/EP2016/072036, dated Dec. 1, 2016, 5 pages.

* cited by examiner

TAILGATE OPENING SYSTEM HAVING TWO CONNECTING RODS

TECHNICAL FIELD

The present invention relates to a rear vehicle assembly comprising:

a body structure, wherein the body structure delimits an opening comprising at least a first lateral edge of the opening and a second lateral edge of the opening, a tailgate, wherein the tailgate is movable relative to the body structure between at least one open position, in which the opening of the body structure is accessible, and a closed position, in which the tailgate closes the opening of the body structure, wherein the tailgate comprises at least a first tailgate lateral edge and a second tailgate lateral edge, and an opening and closing device, wherein the opening and closing device comprises at least a first connecting rod and a second connecting rod fixing the tailgate to the body structure, wherein the first and second connecting rods are each hinged at a first end to the body structure and at a second end to the first tailgate edge.

BACKGROUND

Such an assembly is, in particular, intended to provide access to the trunk of a motor vehicle by opening the tailgate. A user of the motor vehicle may thus, for example, easily load and unload bulky objects from the rear of the vehicle by opening the tailgate.

Such a tailgate generally opens by rotating the tailgate about a hinge placed between the upper edge of the opening and the upper edge of the tailgate. The tailgate thus passes from a closed position that is substantially parallel to the plane of the opening of the body structure, to an open position that is substantially perpendicular to the plane of the opening of the body structure, in which position the tailgate extends over the user's head.

Such systems are, therefore, not entirely satisfactory because they require a large space above and behind the vehicle, and present risks of shocks with the surroundings and may cause damage to the vehicle. In addition, a tailgate equipped with such a system is likely to accidentally hit the user. It is therefore necessary to develop tailgate opening systems with lower opening kinematics, and wherein the tailgate is less bulky in the open position.

SUMMARY

One of the objects of the invention is to provide a vehicle rear assembly whose tailgate opening and closing device has kinematics requiring less space around the vehicle, and has less extensive movements.

For this purpose, the object of the invention is an assembly of the aforementioned type, wherein the first connecting rod comprises, a first substantially rectilinear section from its first end to a first intermediate point, a curved section from the first intermediate point to a second intermediate point, and a second substantially rectilinear section from the second intermediate point to the second end, wherein the two rectilinear sections form acute angles with the tangents to the curved section at their points of contact with the curved section, and wherein the first rectilinear section is located on the concave side of the curved section, while the second rectilinear section is located on the convex side of the curved section.

By arranging for the opening and closing device to comprise two connecting rods to replace the hinge, it is ensured that the opening kinematics will only require minimum space with a low risk of shocks during use, while ensuring optimal access to the interior of the vehicle as the tailgate may pass above the vehicle roof in the open position. Such a device is more robust and simple to implement, and involves reasonable manufacturing costs.

The assembly according to the invention may comprise one or more of the following characteristics, taken in isolation or in any technically feasible combination:

the first connecting rod and the second connecting rod are offset along the first lateral edge of the opening;

the first substantially rectilinear section and the second substantially rectilinear section of the first connecting rod form acute angles with the tangents to the substantially curved section at the first intermediate point and the second intermediate point respectively;

the first rod has rounded corners at the intermediate points between the substantially curved section and the first and second substantially rectilinear sections;

the opening and closing device comprises a third connecting rod and a fourth connecting rod, wherein the third connecting rod and the fourth connecting rod are fixed between the body structure and the second tailgate lateral edge, wherein the third connecting rod has a shape that is identical to the shape of the first connecting rod, while the fourth connecting rod has a shape that is identical to the shape of the second connecting rod;

one of the first and second connecting rods is provided with means designed to rotate the first or second connecting rod around its first end, hinged to the body structure;

the second ends of the first and second connecting rods slide on a rail fixed on the tailgate, that is substantially parallel to the first tailgate edge, wherein the rail is substantially parallel to the plane of the opening in the closed position of the tailgate;

the first connecting rod at least partly circumvents the upper edge of the opening in the open position; and the body structure and tailgate are only connected by the opening and closing device.

BRIEF DESCRIPTION OF THE DRAWINGS

The invention will be better understood upon reading the description which follows, given solely by way of example, and with reference to the appended drawings, wherein.

DETAILED DESCRIPTION

In all that follows, the orientations are the usual orientations of a motor vehicle. In particular, the terms "upper", "lower", "left", "right", "above", "below", "forward" and "backward" generally relate to the normal direction of movement of the motor vehicle and the position of the driver.

Figure 1:
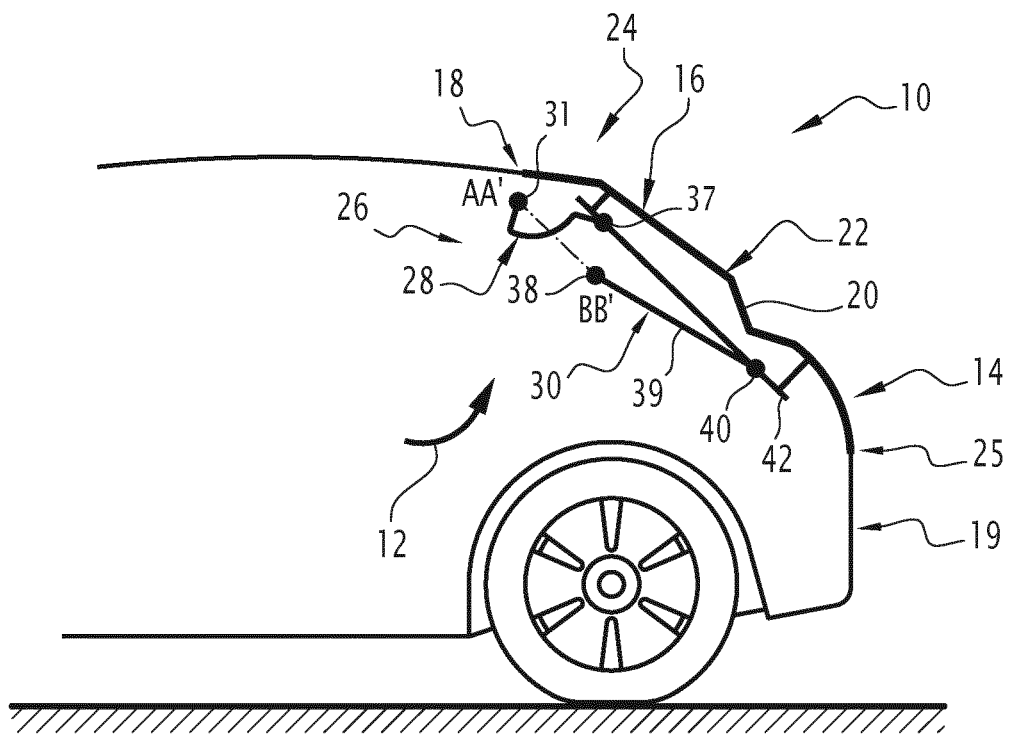
FIG. 1 shows a schematic representation in section, along a longitudinal plane passing through the rear of the vehicle, of the rear assembly according to the invention, wherein the tailgate is in the closed position.
Figure 2:
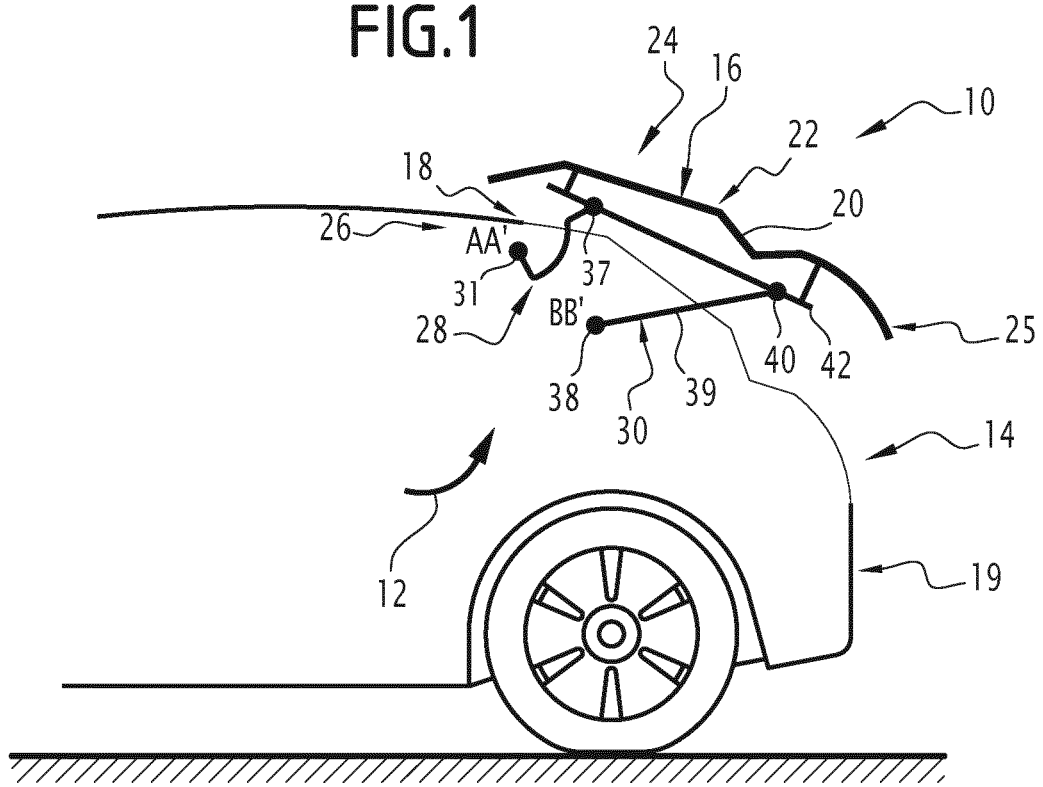
FIG. 2 shows a schematic sectional representation of the rear assembly of FIG. 1, wherein the tailgate is in an intermediate position between the closed position and the open position.
Figure 3:
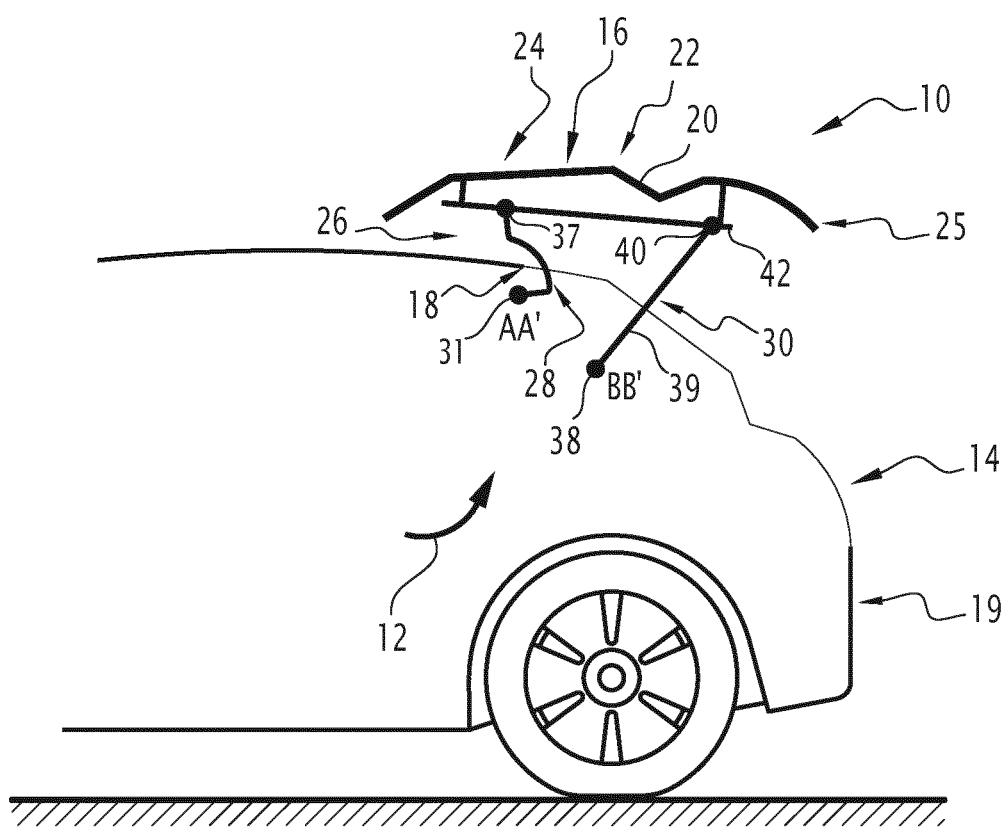
FIG. 3 shows a schematic representation in section of the rear assembly of FIG. 1, wherein the tailgate is in the open position.

A rear vehicle assembly is shown in FIGS. 1 to 3.

The rear assembly 10 comprises a body structure 12.

The body structure 12 defines an opening 14.

The opening 14 is designed to give access to the interior of a rear part of the vehicle from outside the vehicle, for example the trunk and/or the rear shelf of the vehicle.

The opening 14 comprises at least a first lateral edge of the opening 16 and a second lateral edge of the opening (not shown), formed by uprights of the body structure 12.

The first lateral edge of the opening 16 extends substantially in a direction of elevation of the vehicle and is located, for example, to the left of the vehicle.

For symmetry, the second lateral edge of the opening extends substantially in a direction of elevation of the vehicle and is located, for example, to the right of the vehicle.

The opening 14 further comprises an upper edge of the opening 18, extending, for example, between the roof of the vehicle and the lateral edges of the opening 14, and a lower edge of the opening 19, extending, for example, between the floor of the vehicle and the lateral edges of the opening 14.

The rear assembly 10 also comprises a tailgate 20.

Such a tailgate 20 is conventional in a motor vehicle and comprises, for example, glazed surfaces, rear vehicle optics, etc.

The tailgate 20 comprises at least a first tailgate lateral edge 22, a second tailgate lateral edge (not shown), a tailgate upper edge 24 and a tailgate lower edge 25.

The tailgate 20 is movable relative to the body structure 12 between at least one open position and a closed position.

In the closed position, as shown in FIG. 1, the opening 14 of the body structure 12 is isolated from the external surroundings of the vehicle. The first tailgate lateral edge 22 and the second tailgate lateral edge are then respectively pressed against the first lateral edge of the opening 16 and the second lateral edge of the opening, while the upper tailgate edge 24 and the lower tailgate edge 25 are respectively pressed against the upper edge of the opening 18 and the lower edge of the opening 19.

In an open position, as shown in FIG. 3, the opening 14 of the body structure 12 is accessible from outside the vehicle. The first tailgate lateral edge 22 and the second tailgate lateral edge then face the roof of the vehicle.

The rear assembly 10 further comprises an opening and closing device 26.

The opening and closing device 26 fixes the tailgate 20 to the body structure 12.

More particularly, the opening and closing device 26 forms the only fixing of the tailgate 20 to the body structure 12, i.e. there is no other fixing element ensuring the fixing of the tailgate 20 to the body structure 12. The rear assembly 10 according to the invention thus has no direct articulation between the upper edge of the tailgate 24 and the upper edge of the opening 18 of the body structure 12, unlike conventional tailgates of motor vehicles. The opening and closing device 26 is designed to maintain the tailgate 20 closed in the event of a shock. Alternatively, the device 26 may further comprise a closing lock located at the lower edge 25 of the tailgate 20 and designed to interact with a holding member attached to the body structure 12. The lock ensures retention of the tailgate 20 on the body structure 12 in the event of a shock. The tailgate 20 may also comprise two holding hooks located respectively at the upper level of the first tailgate lateral edge 16 and the second tailgate lateral edge 20, wherein they are designed to engage with the tailgate 20 and ensure its retention on the body structure 12 in the closed position.

As illustrated in FIGS. 1 to 3, the opening and closing device 26 comprises a first connecting rod 28 and a second connecting rod 30.

Figure 4:
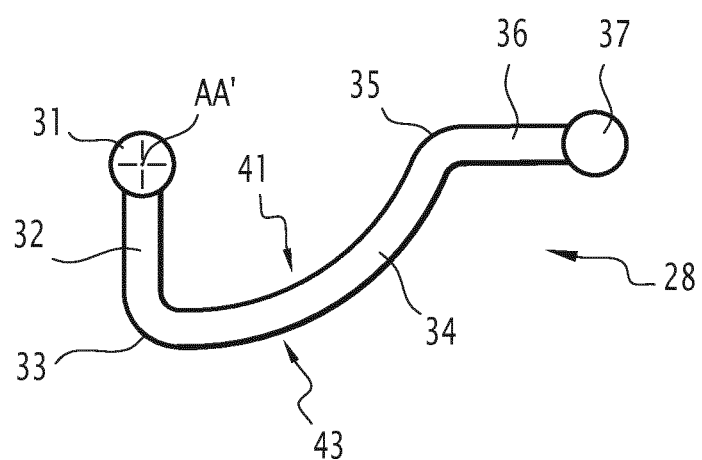
FIG. 4 shows a side representation of the first connecting rod.

The first connecting rod 28 is shown in FIG. 4, and has a first end 31 and a second end 37. Between these ends (31; 37), the first connecting rod 28 comprises:

a first rectilinear section 32, extending substantially rectilinearly between the first end 31 and a first intermediate point 33;

a curved section 34, extending substantially in a curve between the first intermediate point 33 and a second intermediate point 35;

a second rectilinear section 36, extending substantially rectilinearly between the second intermediate point 35 and the second end 37.

The first end 31 of the first connecting rod 28 is provided with a pivot-type connection capable of enabling the first connecting rod 28 to rotate relative to the body structure 12. The second end 37 of the first connecting rod 28 is provided with a pivot-type connection hinging the first connecting rod 28 to the tailgate 20.

The curved section 34 has, for example, the shape of an arc or an elliptical arc, having a concave side 41 and a convex side 43. The first rectilinear section 32 is located on the concave side 41 of the curved section 34, while the second rectilinear section 36 is located on the convex side 43 of the curved section 34, so that the first and second rectilinear sections 32, 36 are on either side of the curved section 34. The two rectilinear sections 32, 36 form intermediate points 33, 35 of the acute angles with local tangents to the curved section 34. These angles lie, for example, substantially between 45° and 90°.

Advantageously, these intermediate points 33, 35 have rounded corners.

The first and second connecting rods are made in one piece and have a rigid structure.

The length of the first rectilinear section 32 is advantageously greater than the distance separating the axis A-A' from the upper edge 18 of the opening 14 and may be, for example, between 250 mm and 350 mm. The length of the second rectilinear section 36 is, for example, between 50 mm and 150 mm. The length of the curved section 34 is, for example, between 400 mm and 750 mm.

The second connecting rod 30 comprises a first end 38 and a second end 40, connected by a substantially rectilinear section 39. The first end 38 of the second connecting rod 30 is provided with a pivot-type connection capable of enabling the second connecting rod 30 to rotate relative to the body structure. The second end 40 of the second connecting rod 30 is provided with a pivot-type connection capable of hinging the second connecting rod 30 to the tailgate 20.

Each of the first ends 31, 38 of the first and second connecting rods 28, 30 is hinged to the lateral edge 16 of the opening 14. In particular, the first connecting rod 28 and the second connecting rod 30 are offset along the lateral edge of the opening 16 along an axis in the plane of the opening 14, and substantially along the first lateral edge of the opening 16.

More particularly, the first end 31 of the first connecting rod 28 is hinged about a transverse axis of rotation A-A', and in the plane of the opening 14. The first end 38 of the second connecting rod 30 is hinged about a transverse axis of rotation B-B', and in the plane of the opening 14. The axis A-A' lies above the axis B-B' in the vicinity of the upper edge of the opening 18. Under normal conditions of use, when the vehicle is flat on a horizontal surface, the axes A-A' and B-B' are horizontal.

Each of the second ends 37, 40 of the first and second connecting rods is hinged to the tailgate 20. According to one embodiment, each of the second ends 37, 40 of the first and second connecting rods is connected in a hinged and sliding manner to a rail 42 that is attached to the tailgate 20, and that is substantially parallel to the first tailgate lateral edge 22. The first and second ends of the first and second connecting rods (31, 37, 38, 40) form the vertices of a parallelogram, in the closed position, as shown in FIG. 1.

According to one embodiment, the rear assembly 10 is symmetrical relative to a longitudinal vertical plane of the vehicle.

The opening and closing device 26 then comprises a third connecting rod and a fourth connecting rod (not shown in FIGS. 1 to 3).

The third connecting rod and the fourth connecting rod are then fixed and arranged in a similar manner to the first connecting rod 28 and the second connecting rod 30 respectively.

In particular, the third connecting rod is substantially identical to the first connecting rod and has the same shape. Similarly, the fourth connecting rod is substantially identical to the second connecting rod and has the same shape. In a symmetrical manner to the first and second connecting rods, the third and fourth connecting rods are hinged to the second lateral edge of the opening 14 at their first ends, and hinged at their second ends to the tailgate 20. According to an embodiment previously described, they are connected in a hinged and sliding manner to a second rail attached to the tailgate 20, wherein the latter is substantially parallel to the second lateral edge of the tailgate.

The third and fourth connecting rods are offset along the second lateral edge of the opening 14. In particular, the first end of the third connecting rod is hinged to rotate about the axis A-A', while the first end of the third connecting rod is hinged to rotate about the axis B-B'.

The operation of the rear assembly 10 according to the invention will now be described.

Initially, a rear assembly 10 is provided, wherein the tailgate 20 is in the closed position as shown in FIG. 1. In this initial position, the curved section 34 of the first connecting rod 28 lies below the first end 31 of the first connecting rod 28. The second end 37 of the first connecting rod 28 lies at the upper end of the rail 42.

When the user wishes to open access to the opening 14 of the body structure 12, the user activates the movement of the tailgate 20, for example manually or automatically. In the case of manual opening, at least one assistance and safety cylinder is added to the rear assembly 10. In the case of automated opening, at least one motor, suitable for rotating the second connecting rod about the axis B-B', is added to the rear assembly 10, as well as a driving assembly that is designed to provide the appropriate opening kinematics.

The tailgate 20 moves from a closed position to an open position by rotating the first connecting rod 28 and the second connecting rod 30 about the respective axes of rotation A-A' and B-B'. The parallelogram formed by the first and second ends of the first and second connecting rods (31, 37, 38, 40) deforms during the rotation of the first and second connecting rods, as may be seen in FIGS. 1 to 3.

During the movement, the curved portion 34 of the first connecting rod 28 passes close to the first end 38 of the second connecting rod 30, but without contact between the first connecting rod 28 and the second connecting rod 30. Such an arrangement results in a compact, space-saving opening and closing device.

The second ends 37, 40 of the first and second connecting rods follow a combined rotation and sliding movement along the rail 42. The translational component of the movement of the second ends 37, 40 is only possible from a minimum opening angle traveled by the first and second connecting rods in their rotation relative to their initial position. For example, this minimum opening angle to allow a translation movement of the second ends 37, 40 lies between 10° and 30°.

The rear assembly 10 passes through an intermediate position illustrated by FIG. 2, wherein the first connecting rod 28 and the second connecting rod 30 project out of the opening 14 and their second ends 37, 40 slide along the rail 42.

The rear assembly 10 reaches an open position shown in FIG. 3, where the second end 40 of the second connecting rod 30 abuts the lower end of the rail 42 and locks to prevent slippage. The tailgate 20 is then positioned above the roof of the vehicle and opens access to the opening 14. The curved section 34 of the first connecting rod 28 then circumvents the upper edge 18 of the opening, so that the first connecting rod 28 does not come into contact with the upper edge of the opening 18 or with the roof of the vehicle, particularly because of the length of the first rectilinear section 32 and the shape of the curved section 34 of the first connecting rod 28.

The closing kinematics are the inverse of the opening kinematics, while the locking of the sliding on the rail 42 is released at the beginning of the operation by the user.

This movement of the tailgate 20 requires little space as the tailgate 20 closely follows the shape of the vehicle during its movement, and ends its course above the roof. The risk of shock between the tailgate and the surroundings or the user is low due to the low amplitude of movement of the tailgate during opening and closing.

The invention claimed is:

1. A rear vehicle assembly comprising:
    a body structure, wherein the body structure delimits an opening comprising at least a first lateral edge of the opening and a second lateral edge of the opening,
    a tailgate, wherein the tailgate is movable relative to the body structure between at least one open position, where the opening of the body structure is accessible, and a closed position, where the tailgate closes the opening of the body structure, and wherein the tailgate comprises at least one first tailgate lateral edge and a second tailgate lateral edge,
    an opening and closing device, wherein the opening and closing device comprises at least one first connecting rod and one second connecting rod fixing the tailgate to the body structure, wherein the first connecting rod and the second connecting rod are each hinged at a first end to the body structure and at a second end to the first tailgate lateral edge,
    wherein the first connecting rod comprises a first rectilinear section from the first end of the first connecting rod to a first intermediate point, a curved section from the first intermediate point to a second intermediate point, and a second rectilinear section from the second intermediate point to the second end of the first connecting rod, wherein the first rectilinear section is located on a concave side of the curved section while the second rectilinear section is located on a convex side of the curved section, and wherein the second end of each of the first connecting rod and the second connecting rod slides on a rail fixed on the tailgate, said rail being parallel to the first tailgate lateral edge, wherein the rail is parallel to a plane of the opening in the closed position of the tailgate.

2. The rear vehicle assembly according to claim 1, wherein the first connecting rod and the second connecting rod are offset along the first lateral edge of the opening.

3. The rear vehicle assembly according to claim 1, wherein the first rectilinear section and the second rectilinear section of the first connecting rod form acute angles with tangents to the curved section at the first intermediate point and at the second intermediate point, respectively.

4. The rear vehicle assembly according to claim 1, wherein the first connecting rod has rounded corners at the first and second intermediate points between the curved section and each of the first rectilinear section and the second rectilinear section.

5. The rear vehicle assembly according to claim 1, wherein the opening and closing device comprises a third connecting rod and a fourth connecting rod, wherein the third connecting rod and the fourth connecting rod are fixed between the body structure and the second tailgate lateral edge, wherein the third connecting rod has a shape that is identical to a shape of the first connecting rod, while the fourth connecting rod has a shape that is identical to a shape of the second connecting rod.

6. The rear vehicle assembly of a vehicle according to claim 1, wherein at least one of the first connecting rod and the second connecting rod is configured for controlled rotation of the first connecting rod and the second connecting rod about the respective first ends hinged to the body structure.

7. The rear vehicle assembly according to claim 1, wherein the first connecting rod at least partially circumvents an upper edge of the opening in the open position.

8. The rear vehicle assembly according to claim 1, wherein the body structure and the tailgate are only connected by the opening and closing device.

* * * * *